(12) United States Patent
Peled et al.

(10) Patent No.: US 9,892,083 B1
(45) Date of Patent: Feb. 13, 2018

(54) METHOD AND APPARATUS FOR CONTROLLING A RATE OF TRANSMITTING DATA UNITS TO A PROCESSING CORE

(71) Applicant: Marvell Israel (M.I.S.L) Ltd., Yokneam (IL)

(72) Inventors: Itay Peled, Hagor (IL); Dan Ilan, Herzelia (IL); Moshe Anschel, Tel-Mond (IL); Michael Weiner, Nes Ziona (IL); Eitan Joshua, Ramot Menashe (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 160 days.

(21) Appl. No.: 14/640,988

(22) Filed: Mar. 6, 2015

Related U.S. Application Data

(60) Provisional application No. 61/949,860, filed on Mar. 7, 2014.

(51) Int. Cl.
 *G06F 13/42* (2006.01)
 *G06F 13/40* (2006.01)
 *G06F 13/16* (2006.01)
(52) U.S. Cl.
 CPC .......... *G06F 13/4221* (2013.01); *G06F 13/16* (2013.01); *G06F 13/4068* (2013.01)
(58) Field of Classification Search
 CPC .................................................. G06F 13/4059
 See application file for complete search history.

(56) References Cited

U.S. PATENT DOCUMENTS

| | | | | |
|---|---|---|---|---|
| 6,678,267 B1* | 1/2004 | Anandakumar | ...... | H04L 12/413 370/356 |
| 6,785,298 B1* | 8/2004 | Hwang | ................ | H04B 1/707 370/335 |
| 7,970,163 B2* | 6/2011 | Nakama | ................ | H04L 67/06 382/100 |
| 8,621,542 B2* | 12/2013 | Klamer | ................ | H04N 21/231 370/386 |
| 2003/0161413 A1* | 8/2003 | Jensen | ................ | H04B 1/406 375/319 |
| 2011/0228674 A1* | 9/2011 | Pais | ........................ | H04L 49/90 370/235 |

* cited by examiner

*Primary Examiner* — Farley Abad

(57) ABSTRACT

Embodiments include a network device comprising: at least one processing core; a packet processing module configured to perform a first set of packet processing operations at a first rate, to partially process data units that are received at the network device, the packet processing module being further configured to transmit ones of the data units to the at least one processing core, the at least one processing core being configured to perform a second set of processing operations at a second rate, wherein the second set of processing operations is different from the first set of processing operations; an interconnecting module configured to interconnect the packet processing module and the at least one processing core; and a rate limiter configured to selectively control a transmission rate at which the data units are transmitted by the packet processing module to the at least one processing core based on the second rate.

20 Claims, 3 Drawing Sheets

METHOD AND APPARATUS FOR CONTROLLING A RATE OF TRANSMITTING DATA UNITS TO A PROCESSING CORE

CROSS REFERENCE TO RELATED APPLICATIONS

This claims priority to U.S. Provisional Patent Application No. 61/949,860, filed on Mar. 7, 2014, which is incorporated herein by reference in its entirety.

TECHNICAL FIELD

Embodiments of the present disclosure relate to a computing system, and in particular to controlling a rate of transmitting data units to a processing core.

BACKGROUND

In a various network devices, a packet processing module is configured to perform one or more predefined processing operations. Ingress data units are received at the network device, and the packet processing module selectively stores the data units in a cache following processing. One or more programmable processing cores, separate from the packet processing module, selectively fetch the data units from the cache for further processing.

However network traffic often-times arrives in bursts. Although the packet processing module may perform its processing operations at a sufficiently fast rate to accommodate bursts of network traffic, the one or more processing cores may not be able to fetch data units from the cache fast enough to prevent overflow of the cache. Typically, when the cache overflows, some data units will be lost from the cache.

SUMMARY

In various embodiments, the present disclosure provides a network device comprising: at least one processing core; a packet processing module configured to perform a first set of packet processing operations at a first rate, to partially process data units that are received at the network device, the packet processing module being further configured to transmit ones of the data units to the at least one processing core, the at least one processing core being configured to perform a second set of processing operations at a second rate, wherein the second set of processing operations is different from the first set of processing operations; an interconnecting module configured to interconnect the packet processing module and the at least one processing core; and a rate limiter configured to selectively control a transmission rate at which the data units are transmitted by the packet processing module to the at least one processing core based on the second rate.

In various embodiments, the present disclosure also provides a method comprising receiving, at a packet processing module, data units; performing, by the packet processing module, a first set of packet processing operations at a first rate, to partially process the received data units; transmitting, by the packet processing module, ones of the data units to at least one processing core; performing, by the at least one processing core, a second set of processing operations at a second rate, wherein the second set of processing operations is different from the first set of processing operations; and selectively controlling a transmission rate at which the data units are transmitted by the packet processing module to the at least one processing core based on the second rate.

BRIEF DESCRIPTION OF THE DRAWINGS

Embodiments of the present disclosure will be readily understood by the following detailed description in conjunction with the accompanying drawings. To facilitate this description, like reference numerals designate like structural elements. Various embodiments are illustrated by way of example and not by way of limitation in the figures of the accompanying drawings.

DETAILED DESCRIPTION

Figure 1:
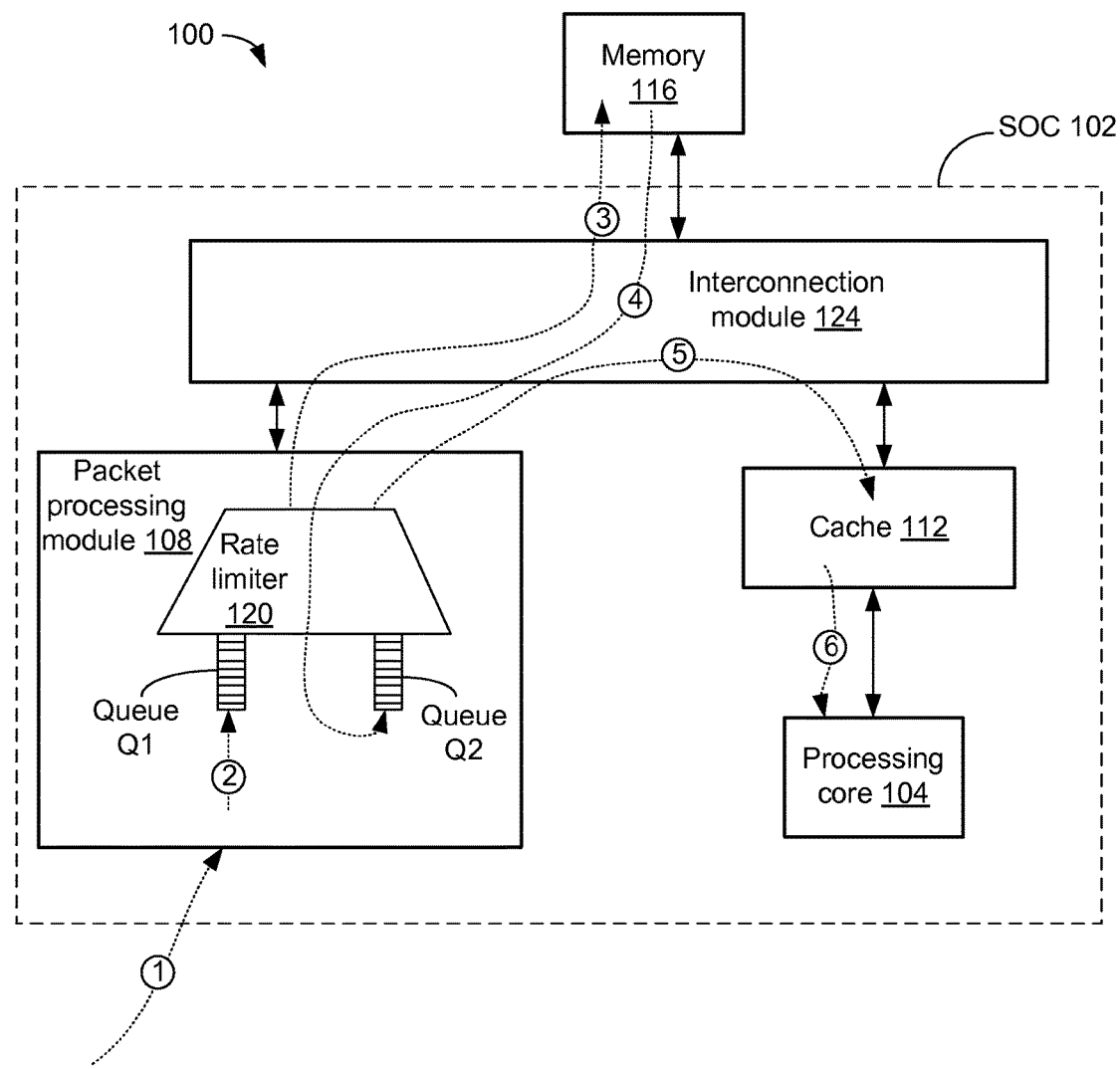
FIG. 1 schematically illustrates a network device comprising a processing core, a packet processing module, and a rate limiter configured to control a rate at which data units are transmitted from the packet processing module to the processing core, in accordance with an embodiment.

FIG. 1 schematically illustrates a network device 100 comprising a processing core 104, a packet processing module 108, and a rate limiter 120 configured to control a rate at which data units are transmitted from the packet processing module 108 to the processing core 104. The network device 100 further comprises a cache 112 communicatively coupled to the processing core 104, and a memory 116. In an embodiment, an interconnect module 124 interconnects the packet processing module 108 to the memory 116 and to the cache 112. Although referred to as a processing core 104, in an embodiment, the processing core 104 represents or includes a plurality of processing cores (e.g., possibly tens, hundreds or thousands of independent processing cores). In an embodiment, the processing core(s) are run-to-completion programmable processing cores that are driven by software code configured to perform a programmable set of processing operations on received data units.

In an embodiment, the network device is configured as a system on chip 102 that receives a stream of data units (e.g., data packets). The data units, for example, are received over a network (not illustrated in FIG. 1) to which the network device 100 is coupled. The packet processing module 108 is an ASIC module configured to perform a pre-defined first set of processing operations. For example the packet processing module 108 is configured to pre-process the data units, e.g., to parses and classify the data units, etc., in an embodiment. The packet processing module 108 pre-processes the data units that are received at a first rate in the packet processing module 108 (i.e., the first rate is an ingress rate of the data units at the packet processing module 108, and/or a rate at which the packet processing module 108 pre-processes the data units), and subsequently transmits the data units to the processing cores 104. The one or more processing cores 104 perform a second set of processing operations that is different from the first set of processing operations performed by the packet processing module 108 on the received data units. In an embodiment, data units are transferred to the one or more processing cores by storing the data units to the cache 112 that is shared by one or more of processing cores 104, in an embodiment. As a processing core, among the one or more processing cores 104, becomes available to process a data unit, the available processing core fetches a data units from the cache 112 and continues to perform the second set of processing operations on the fetched data unit.

In an example, the data units are received at the packet processing module 108 in short bursts (e.g., the ingress rate of the data units at the packet processing module 108 is relatively high during such bursts of data units). In an embodiment, the processing core 104 is capable of processing the data units at a second rate (e.g., the second rate represents a maximum rate at which the processing core 104 processes data units) that, for example, is less than the first rate. In an embodiment, the rate limiter 120 is configured to control a rate at which the data units are transmitted by the packet processing module 108 to the processing core 104, so as not to exceed a rate at which the processing core is able to process the data units. For example, the data units are transmitted by the packet processing module 108 via the interconnection module 124 and cache 112 to the processing core 104 at a third rate, which is based on the second rate at which the processing core 104 is capable of processing the data units, as will be discussed in further detail herein later. As an example, the third rate at which the data units are transmitted by the packet processing module 108 to the processing core 104 is equal to, or less than the second rate at which the processing core 104 processes data units. Controlling the rate at which the data units are transmitted by the packet processing module 108 to the processing core 104, for example, prevents overflow of the cache 112 during ingress bursts of the data units.

In an embodiment, the memory 116 is external to the SOC 102, as illustrated in FIG. 1. In an embodiment, the memory 116 has sufficient storage space to at least temporarily store the overflow data units from the packet processing module 108 (e.g., when the packet processing module 108 receives brusty traffic).

In an embodiment, one or more components of the network device 100 are included in a system on a chip (SOC) 102. For example, FIG. 1 illustrates the packet processing module 108, the cache 112, the processing core 104 and the interconnect module 124 being included in the SOC 102, although in another example, the SOC 100 includes one or more other components of the network device 100 (although, in yet another embodiment, the network device 100 does not have an SOC comprising these components).

In an embodiment, the cache 112 is a level 1 (L1) cache, a level 2 (L2) cache, or the like. In an embodiment, the memory 116 is any appropriate type of memory, e.g., a synchronous dynamic random-access memory (SDRAM), a double data rate SDRAM (DDR SDRAM), or the like.

As previously discussed herein, the interconnect module 124 is configured to interconnect the packet processing module 108 to the memory 116 and to the cache 112. The interconnect module 124 is also configured to interconnect the memory 116 to the cache 112. The interconnect module 124 facilitates communication between various components coupled to the interconnect module 124. The interconnect module 124, for example, comprises one or more crossbars, one or more communication buses, a SOC fabric, and/or the like.

Although FIG. 1 illustrates the rate limiter 120 to be included in the packet processing module 108, in another embodiment, one or more of the components of the rate limiter 120 is external to the packet processing module 108. Irrespective of the architecture of the rate limiter 120, the key functionality of the rate limiter 120 remains to limit the rate at which data units are provided to the cache/processing cores.

In an embodiment, the rate limiter 120 is coupled to a queue Q1 configured to receive and queue a stream of data units (e.g., which are received over a network). In an embodiment, the rate limiter 120 is coupled to another queue Q2 configured to queue data units that are to be written in the cache 112. In an example, ones of the queues Q1 and Q2 are first-in first-out (FIFO) queues.

FIG. 1 also illustrates, using dotted lines, flow of data units within the network device 100. Each dotted line has a corresponding number (within a corresponding circle), where the numbers illustrate an example sequence of the flow of data units within the network device 100. FIG. 1 illustrates a scenario in which the rate limiter 120 limits or controls a rate at which data units are transmitted by the packet processing module 108 to the processing core 104 (e.g., via the cache 112).

Referring to the dotted lines in FIG. 1, initially, a sequence or stream of data units are received by the network device 100 (e.g., by the packet processing module 108, in an embodiment) from a source that is external to the network device 100 (for example, from a network, e.g., the Internet), illustrated using the dashed line with the circled number "1".

Subsequently, in an embodiment, the data units are queued in the queue Q1 (e.g., illustrated using the dashed line with the circled number "2"). In an embodiment, prior to the data units being queued in the queue Q1, the packet processing module 108 processes the data units. As an example, the packet processing module 108 parses and classifies the data units and/or performs other predetermined processing operations, e.g., to determine one or more characteristics of the data units. For example, the packet processing module 108 determines a type of the data units, a priority associated with the data units, and/or the like.

Once the data units are queued in the queue Q1, the data units are either (i) transmitted to the memory 116 (e.g., if the rate limiter 120 is limiting the rate at which data units are transmitted to the processing core 104), or (ii) to the processing core 104 via the cache 112 (e.g., if the rate limiter 120 is not limiting the rate at which data units are transmitted to the processing core 104). In the example of FIG. 1, the rate limiter 120 is limiting the rate at which data units are transmitted to the processing core 104, and hence, the data units are transmitted to the memory 116 (e.g., illustrated using the dashed line with the circled number "3").

The memory 116 temporarily stores the data units, e.g., to limit the rate at which the data units are transmitted to the cache 112 and to buffer data units that are received faster than the limited rate at which partially processed data units are provided to the cache/processing core. The data units are transmitted from the memory 116 to the queue Q2 (e.g., illustrated using the dashed line with the circled number "4"), and transmitted from the queue Q2 to the cache 112 (e.g., illustrated using the dashed line with the circled number "5"). Thus, the data units are stashed in the cache 112, to allow the processing core 104 to fetch the data units from the cache 112 (e.g., illustrated using the dashed line with the circled number "6"), without overflowing the cache 112 or dropping data units, in an embodiment.

In an example, the data units are received at the packet processing module 108 in bursts. In an example, data units are sporadically received at the packet processing module 108 (or not received at all) during a first duration of time. However, during a short second duration of time, a large number of data units are received at the packet processing module 108, i.e., are received in a burst. The memory 116 is used to absorb such a burst of data units, when the rate at which data units are received exceeds the rate, imposed by rate limiter 120, at which data units are transferred to processing core 104, so that the rate limiter 120 and the packet processing module 108 are able to write the data units in the cache 112 at a lower or somewhat uniform rate. If the memory 116 is not used to absorb the burst of data units and if the rate limiter 120 is not used to limit the rate of flow of data units from the packet processing module 108 to the cache 112, then the cache 112 will receive the data units at a rate that is much faster than the rate at which the processing core 104 fetches the data units from the cache 112 and processes the data units, which would possibly result in a dropping of data units. For example, such a situation conventionally would result in the cache 112 becoming full during such bursts of data units, such that the cache 112 would be overwritten with new data, before the processing core 104 gets a chance to fetch old data from the cache (e.g., thereby leading to frequent cache miss by the processing core 104).

Accordingly, the rate limiter 120 limits the rate at which data units are written to the cache 112 by the packet processing module 108 such that the processing core 104 fetches and processes the data units from the cache 112, prior to new data units being written to the cache 112 by the packet processing module 108. For example, if the processing core 104 is able to fetch from the cache 112 and process the data units at a maximum of a first rate, then the packet processing module 108 writes the data units to the cache 112 at a second rate that is equal to, or less than the first rate.

In an embodiment, the data units temporarily stored by the rate limiter 120 in the memory 116 is stored in a non-coherent space of the memory 116. That is, the data units are stored non-coherently in the memory 116. For example, the temporary storing of the data units in the memory 116 does not necessitate synchronizing the memory with the cache 112 (or with any other cache of the network device 100).

In FIG. 1, data units are transmitted from the queue Q1 to the memory 116 (e.g., illustrated using the dashed line with the circled number "3"), and the rate limiter 120 does not limit a rate of the transmission of the data units from the queue Q1 to the memory 116. Rather, the rate limiter 120 selectively limits (i) the rate at which the data units are retrieved from the memory 116 to the queue Q2 (e.g., illustrated using the dashed line with the circled number "4") and/or (ii) the rate at which the data units are transmitted from the queue Q2 to the cache 112 (e.g., illustrated using the dashed line with the circled number "5"). Thus, in an example and unlike the illustration of FIG. 1, the rate limiter 120 is configured to limit the rate of transmission of data units to and/or from the queue Q2 (e.g., without limiting the rate of transmission of data units to and/or from the queue Q1).

Figure 2:
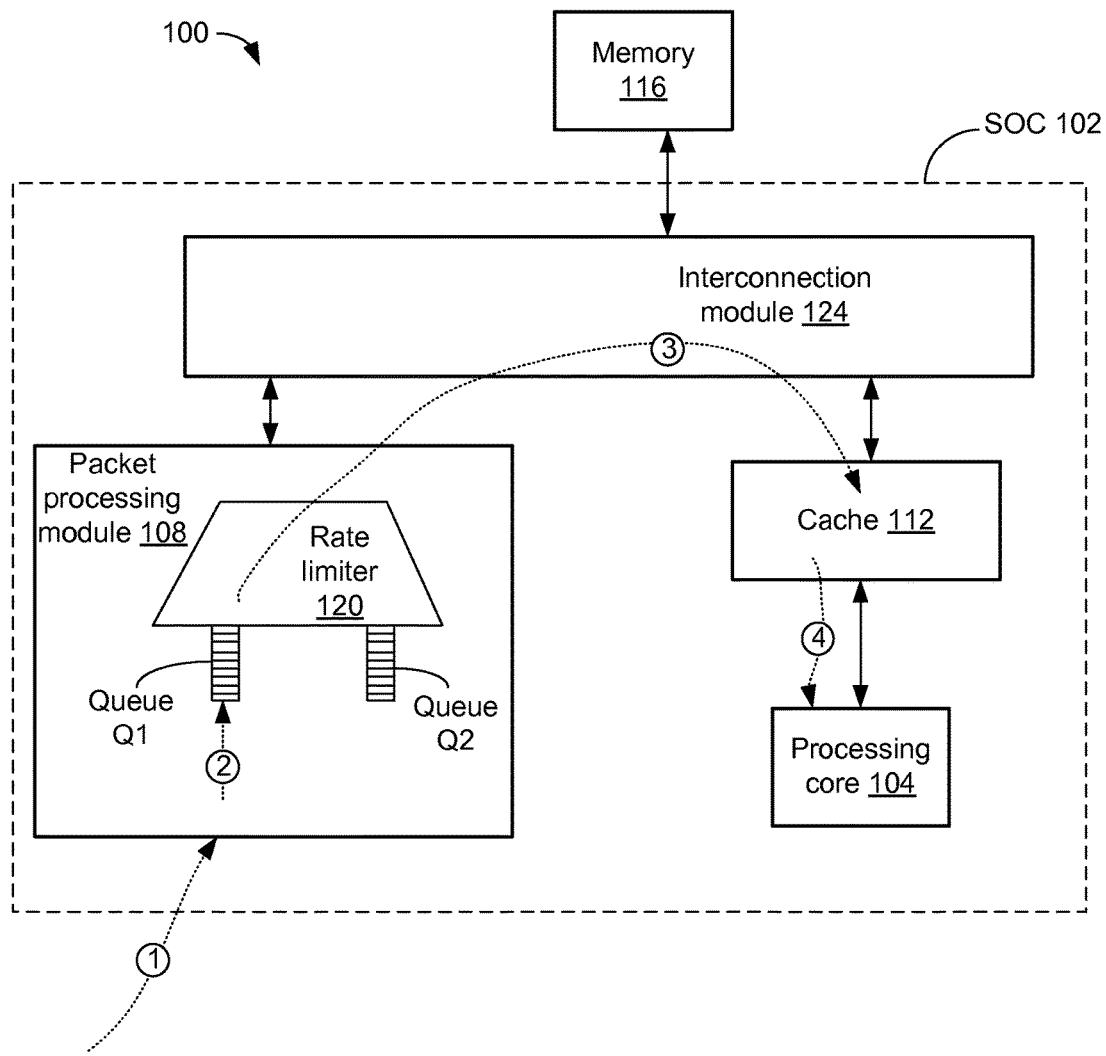
FIG. 2 schematically illustrates the network device of FIG. 1, in which the rate limiter does not limit a rate at which data units are transmitted from the packet processing module to the processing core, in accordance with an embodiment.

FIG. 1 illustrates a scenario in which the data units are temporarily stored in the memory 116, for example, to absorb a burst of data units. However, when the ingress rate of the data units is relatively less (e.g., less than the rate at which data units are processed by the processing ore 104), the rate limiter 120 does not need to limit the rate at which the data units are written to the cache 112. FIG. 2 schematically illustrates the network device 100 of FIG. 1, in which the rate limiter 120 does not limit a rate at which data units are transmitted from the packet processing module 108 to the processing core 104. For example, when the ingress rate of data units received at the packet processing module 108 is equal to or less than the rate at which the processing core 104 can process the data units, the rate limiter 120 need not limit the rate at which the data units are written by the packet processing module 108 to the cache 112.

Accordingly, referring to FIG. 2, once the data units are received by the packet processing module 108 (e.g., illustrated using the dashed line with the circled number "1" in FIG. 2) and queued in the queue Q1 (e.g., illustrated using the dashed line with the circled number "2" in FIG. 2), the data units are directly written to the cache 112 (e.g., illustrated using the dashed line with the circled number "3" in FIG. 2), by bypassing the memory 116. Thus, the data units are stashed in the cache 112, to allow the processing core 104 to fetch the data units from the cache 112 (e.g., illustrated using the dashed line with the circled number "4" in FIG. 2).

Referring to FIGS. 1 and 2, in an embodiment, the rate limiter 120 determines an ingress rate of incoming data units at the packet processing module 108, and compares the ingress rate of the incoming data units to a threshold rate. If the ingress rate of the incoming data units is higher than the threshold rate, the rate limiter 120 limits or reduces the rate at which data units are written by the packet processing module 108 to the cache 112, e.g., as illustrated in FIG. 1.

On the other hand, if the ingress rate of the incoming data units is lower than the threshold rate, the rate limiter 120 does not limit or reduce the rate at which data units are written by the packet processing module 108 to the cache 112, e.g., as illustrated in FIG. 2—in such a scenario, the rate at which data units are written by the packet processing module 108 to the cache 112 is substantially similar to the ingress rate of the incoming data units at the packet processing module 108, in an embodiment.

In an example, the above discussed threshold rate is based on the processing rate of the processing core 104. For example, the threshold rate is equal to (or slightly less than) the processing rate of the processing core 104 and/or a rate at which the processing core 104 fetches the data units from the cache 112. In another example, the threshold rate is equal to a maximum processing rate of the processing core 104.

In an example, subsequent to the packet processing module 108 receiving a data unit (e.g., illustrated using the dashed line with the circled number "1" in FIGS. 1 and 2), the packet processing module 108 writes only a section of the data unit (e.g., which is less than an entirety of the data unit) to the cache 112 (e.g., illustrated using the dashed line with the circled number "5" in FIG. 1, and illustrated using the dashed line with the circled number "3" in FIG. 2). In another example, however, the packet processing module 108 writes the entirety of the data unit to the cache 112.

As an example, the data unit is a data packet. Once the packet processing module 108 receives the data packet, the packet processing module 108 parses and classifies the data packet. Based on the classification, the packet processing module 108 writes only a section of the data packet (e.g., only the header of the data packet) to the cache 112, for example, if the packet processing module 108 determines that the processing core 104 is likely to fetch only the header of the data packet from the cache 112 (e.g., if the data packet is relatively less time sensitive). In another example, based on the classification, the packet processing module 108 writes the entire data packet to the cache 112, for example, if the packet processing module 108 determines that the processing core 104 is likely to fetch the entire data packet from the cache 112 (e.g., if the data packet is relatively critical and time sensitive).

In yet another example, the packet processing module 108 writes only a corresponding section of each of the data units received by the packet processing module 108 to the cache 112.

Figure 3:
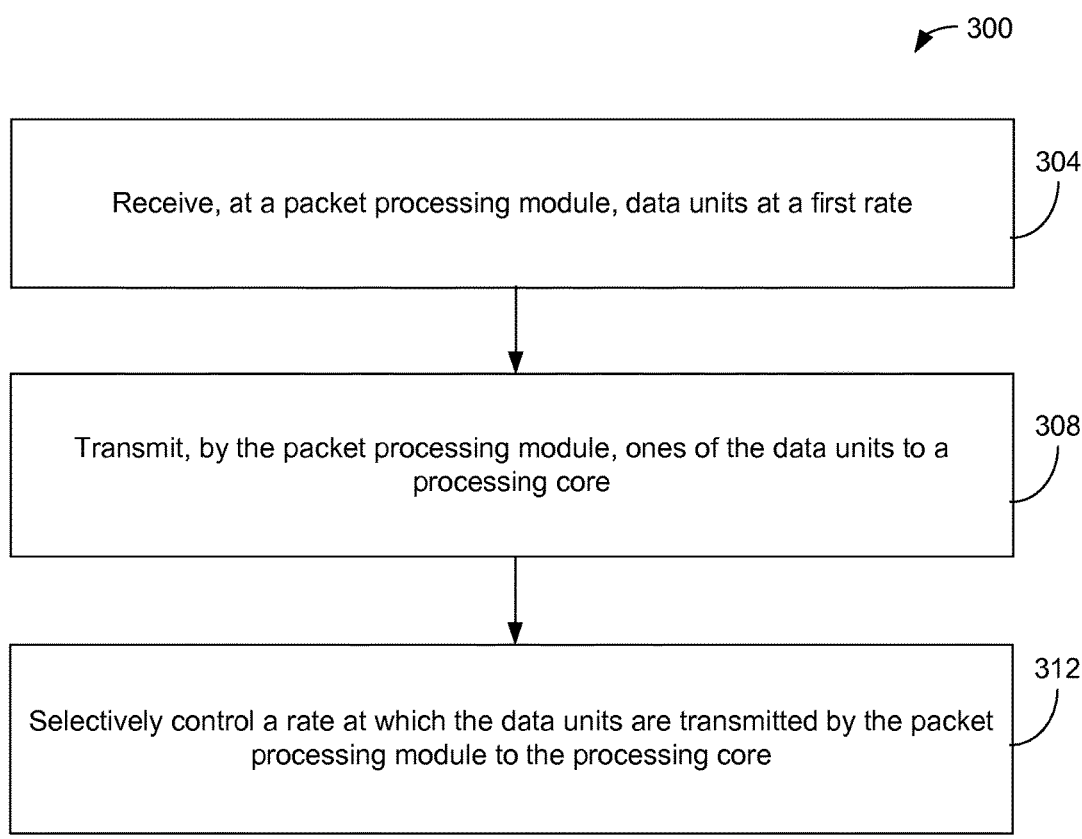
FIG. 3 is a flow diagram of an example method for controlling a rate at which data units are transmitted from a packet processing module to a processing core, in accordance with an embodiment.

FIG. 3 is a flow diagram of an example method 300 for controlling a rate at which data units are transmitted from a packet processing module (e.g., the packet processing module 108) to a processing core (e.g., the processing core 104), in accordance with an embodiment. At 304, data units are received at the packet processing module at a first rate.

At 308, the packet processing module transmits ones of the data units to the processing core. For example, the packet processing module writes the data units to a cache (e.g., the cache 112), from which the processing core fetches the data units.

At 312, a rate at which the data units are transmitted by the packet processing module to the processing core is selectively controlled (e.g., by the rate limiter 120) to be less than a rate at which processing core 104 is able to process data units. For example, the first rate is compared to a threshold rate. In response to the first rate being higher than the threshold rate, the rate at which the data units are transmitted is controlled such that the rate at which the data units are transmitted is less than the first rate. On the other hand, in response to the first rate being lower than the threshold rate, the rate at which the data units are transmitted is controlled such that the rate at which the data units are transmitted is substantially equal to the first rate.

Although certain embodiments have been illustrated and described herein, a wide variety of alternate and/or equivalent embodiments or implementations calculated to achieve the same purposes may be substituted for the embodiments illustrated and described without departing from the scope of the present invention. This application is intended to cover any adaptations or variations of the embodiments discussed herein. Therefore, it is manifestly intended that embodiments in accordance with the present invention be limited only by the claims and the equivalents thereof.

What is claimed is:

1. A network device comprising:
   at least one processing core;
   a packet processing module configured to perform a first set of packet processing operations, to partially process data units that are received at the network device from a network, wherein the first set of packet processing operations comprises parsing and classifying data units, wherein the packet processing operations are performed at a first rate, the packet processing module being further configured to transmit ones of the data units to the at least one processing core, the at least one processing core being configured to perform a second set of processing operations at a second rate, the second rate corresponding to a rate at which the at least one processing core performs the second set of processing operations, and wherein the second rate is slower than the first rate and the second set of processing operations is different from the first set of processing operations;
   an interconnecting module configured to interconnect the packet processing module and the at least one processing core; and
   a rate limiter configured to selectively control a transmission rate at which the data units are transmitted by the packet processing module to the at least one processing core based on the second rate.

2. The network device of claim 1, further comprising:
   cache,
   wherein the packet processing module is configured to transmit ones of the data units to the at least one processing core by writing ones of the data units to the cache, and
   wherein the at least one processing core is configured to fetch ones of the data units from the cache.

3. The network device of claim 2, wherein the interconnecting module is further configured to interconnect the packet processing module to the at least one processing core via the cache.

4. The network device of claim 1, wherein the rate limiter is configured to selectively control the transmission rate to be less or equal to the second rate.

5. The network device of claim 1, wherein the rate limiter is configured to selectively control the transmission rate by:
   comparing the first rate to a threshold rate, wherein the threshold rate is based on the second rate; and
   in response to the first rate being higher than the threshold rate, rate limiting the transmission rate to be less than the first rate.

6. The network device of claim 5, wherein the rate limiter is configured to selectively control the transmission rate by:
   in response to the first rate being lower than the threshold rate, not limiting the transmission rate.

7. The network device of claim 5, wherein the rate limiter is configured to selectively control the transmission rate based on comparing the first rate with the second rate.

8. The network device of claim 1, further comprising:
   memory that is coupled to the packet processing module via the interconnecting module,
   wherein the memory is configured to temporarily store one or more of the data units from the packet processing module, while the rate limiter limits the rate at which the data units are transmitted by the packet processing module to the at least one processing core.

9. The network device of claim 1, wherein:
   subsequent to the memory temporarily storing the one or more of the data units, the rate limiter is further configured to facilitate transmission of the one or more of the data units from the memory to the processing core at the transmission rate.

10. The network device of claim 1, wherein the network device is configured to receive the data units from a network, wherein the packet processing module is configured to perform the first set of packet processing at the first rate, and wherein the first rate is sufficiently fast to process the data units at a rate at which received.

11. A method comprising:
   receiving, at a packet processing module, data units from a network;
   performing, by the packet processing module, a first set of packet processing operations, to partially process the received data units, wherein the first set of packet processing operations comprises parsing and classifying data units, and wherein the packet processing operations are performed at a first rate;
   transmitting, by the packet processing module, ones of the data units to at least one processing core;
   performing, by the at least one processing core, a second set of processing operations at a second rate, the second rate corresponding to a rate at which the at least one processing core performs the second set of processing operations, wherein the second rate is slower than the first rate and the second set of processing operations is different from the first set of processing operations; and selectively controlling a transmission rate at which the data units are transmitted by the packet processing module to the at least one processing core based on the second rate.

12. The method of claim 11, wherein transmitting, by the packet processing module, ones of the data units to at least one processing core comprise:
   writing ones of the data units to a cache; and
   fetching, by the at least one processing core, ones of the data units from the cache.

13. The method of claim 12, further comprising:
   interconnecting, via an interconnecting module, the packet processing module to the at least one processing core via the cache.

14. The method of claim 11, wherein selectively controlling the transmission rate comprises:
   selectively controlling the transmission rate to be less or equal to the second rate.

15. The method of claim 11, wherein selectively controlling the transmission rate comprises:
   comparing the first rate to a threshold rate, wherein the threshold rate is based on the second rate; and
   in response to the first rate being higher than the threshold rate, rate limiting the transmission rate to be less than the first rate.

16. The method of claim 15, wherein selectively controlling the transmission rate further comprises:
   in response to the first rate being lower than the threshold rate, not limiting the transmission rate.

17. The method of claim 15, wherein selectively controlling the transmission rate comprises:
   based on comparing the first rate with the second rate, selectively controlling the transmission rate.

18. The method of claim 11, further comprising:
   temporarily storing, by memory that is coupled to the packet processing module, one or more of the data units from the packet processing module, while the transmission rate is being selectively controlled.

19. The method of claim 11, wherein:
   subsequent to the memory temporarily storing the one or more of the data units, transmitting the one or more of the data units from the memory to the processing core at the transmission rate.

20. The method of claim 11, wherein the data units are received from a network, and wherein the method further comprises:
   performing, by the packet processing module, the first set of packet processing at the first rate, the first rate being sufficiently fast to process the data units at a rate at which received from the network.

* * * * *